United States Patent [19]

Graham

[11] Patent Number: 5,863,996
[45] Date of Patent: Jan. 26, 1999

[54] SOLUTION POLYMERIZATION TO FORM SOL OF CROSSLINKED PARTICLES

[75] Inventor: Neil Bonnette Graham, Bearsden, Scotland

[73] Assignee: National Research Development Corporation, London, England

[21] Appl. No.: 487,394

[22] Filed: Jun. 7, 1995

Related U.S. Application Data

[62] Division of Ser. No. 195,452, Feb. 14, 1994, abandoned, which is a continuation of Ser. No. 425,356, Oct. 20, 1989, abandoned, which is a continuation of Ser. No. 59,181, Jun. 12, 1987, abandoned, which is a continuation of Ser. No. 906,598, Sep. 10, 1986, abandoned, which is a continuation of Ser. No. 767,705, Aug. 22, 1985, abandoned, which is a continuation of Ser. No. 655,990, Sep. 28, 1984, abandoned, which is a continuation of Ser. No. 552,020, Nov. 17, 1983, abandoned, which is a continuation of Ser. No. 335,526, Dec. 29, 1981, abandoned.

[30] Foreign Application Priority Data

Dec. 30, 1980 [GB] United Kingdom .................. 8041499

[51] Int. Cl.⁶ .............................. C08F 2/06; C08F 220/00
[52] U.S. Cl. ......................... 526/216; 526/222; 526/256; 526/261; 526/266; 526/320
[58] Field of Search .................................... 526/222, 216, 526/256, 261, 266, 320, 281, 323, 323.1, 323.2

[56] References Cited

U.S. PATENT DOCUMENTS

| | | | |
|---|---|---|---|
| 2,308,236 | 1/1943 | Pollack . | |
| 2,510,503 | 6/1950 | Kropa . | |
| 2,952,668 | 9/1960 | Ehlers | 526/261 |
| 3,000,690 | 9/1961 | Murdoch | 526/256 |
| 3,049,517 | 8/1962 | Caton | 526/261 |
| 3,072,679 | 1/1963 | Batzer | 526/266 |
| 3,222,282 | 12/1965 | Berkowitz | 526/261 |
| 3,294,749 | 12/1966 | Pratt | 526/266 |
| 3,318,846 | 5/1967 | Smith | 526/256 |
| 3,364,182 | 1/1968 | Griffith | 526/329.7 |
| 3,365,404 | 1/1968 | Bailey, Jr. | 526/273 |
| 3,941,849 | 3/1976 | Herold | 526/273 |
| 3,971,766 | 7/1976 | Ono | 526/323.2 |
| 4,220,728 | 9/1980 | Kresta | 528/85 |
| 4,668,730 | 5/1987 | Iovine | 524/460 |

FOREIGN PATENT DOCUMENTS

| | | |
|---|---|---|
| 31346 | 11/1964 | Germany . |
| 34937 | 10/1971 | Japan . |
| 63314 | 4/1982 | Japan . |

*Primary Examiner*—Christopher Henderson
*Attorney, Agent, or Firm*—Oblon, Spivak, McClelland, Maier & Neustadt, P.C.

[57] ABSTRACT

A solution polymerization process for the preparation of a polymeric material having a weight average molecular weight from 5,000 to 20,000,000 and comprising cross-linked particles which are capable of forming a sol in the reaction solvent, which process comprises:

(i) polymerizing one or more monomers, the or at least one of which is a cross-linking agent, in a solvent which (a) has a solubility parameter from 2.5 $cal^{1/2}$ $ml^{-3/2}$ below to 1.0 $cal^{1/2}$ $ml^{-3/2}$ above the solubility parameter of the bulk polymeric material and (b) is of the same or adjacent hydrogen bonding group as the bulk polymeric material;

(ii) monitoring the polymerization until polymeric material as herein defined is obtained; and (iii) terminating the polymerization before gelation is observed.

2 Claims, No Drawings

SOLUTION POLYMERIZATION TO FORM SOL OF CROSSLINKED PARTICLES

This is a division of Application Ser. No. 08/195,452 filed on Feb. 14 1994, now abandoned, which is a Continuation of application Ser. No 07/425,356, filed Oct. 20, 1989, abandoned; which is a Continuation of application Ser. No. 07/059,181, filed Jun. 12, 1987, abandoned; which is a continuation of application Ser. No. 06/906,598, filed Sep. 10, 1986, abandoned; which is a Continuation of application Ser. No 06/767,705, filed Aug. 22, 1985, abandoned; which is a Continution of applicaiton Ser. No. 06/655,990, filed Sep. 28, 1984, abandoned which is a Continuation of application Ser. No. 06/552,020, filed Nov. 17, 1983, abanonded; which is a Continuation of application Ser. No. 06/335,526 filed Dec. 21, 1981.

This invention relates to polymeric materials; more particularly this invention relates to polymeric materials comprising cross-linked particles which are capable of forming sols; to processes for their preparation; and to compositions comprising them.

According to one aspect of this invention, there is provided a solution polymerisation process for the preparation of a polymeric material having a weight average molecular weight from 5,000 to 20,000,000 and comprising cross-linked particles which are capable of forming a sol in the reaction solvent, which process comprises:

(i) polymerising one or more monomers, the or at least one of which is a cross-linking agent, in a solvent which (a) has a solubility parameter from 2.5 cal$^{1/2}$ ml$^{-3/2}$ below to 1.0 cal$^{1/2}$ ml$^{-3/2}$ above the solubility parameter of the bulk polymeric material and (b) is of the same or adjacent hydrogen bonding group as the bulk polymeric material;

(ii) monitoring the polymerisation until a polymeric material as herein defined is obtained; and (iii) terminating the polymerisation before gelation is obtained.

The solution polymerisation process of the invention may be an addition, for example a cationic, anionic or free radical, polymerisation or a condensation polymerisation.

A class of addition polymerisation to which the present invention may advantageously be applied is cationic addition polymerisation to which the following types of monomer, inter alia, are susceptible:

(a) cyclic and linear mono- and poly-vinyl (thio)ethers, including furfural and furfuryl alcohol;

(b) other compounds comprising at least one 3- or 4-membered oxa-or thia- substituted ring, for example mono- and poly-epoxides and lactones with a 4-membered ring;

(c) cyclic aliphatic anhydrides, for example maleic anhydrides;

(d) aliphatic aldehydes; and (e) mono- and poly-vinyl aromatic hydrocarbons, such as styrene, alkyl styrenes, such as vinyl toluene, divinyl benzene and indene.

Mixtures of such monomers may be used.

In accordance with a preferred aspect of this invention the, or one of the, monomers comprises a polymerisable cyclic (thio)ether. By "(thio)ether" is meant herein an ether or a thioether. Suitable polymerisable cyclic (thio)ethers have the formula:

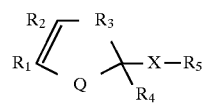

in which:

$R_1$, $R_2$ and $R_4$, which may be the same or different, each represent a hydrogen atom or a substituted or unsubstituted hydrocarbyl or hydrocarbyloxy group;

$R_3$ represents a substituted or unsubstituted methylene, ethylene or 1,3-propylene group;

$R_5$ represents a monovalent polymerisable group;

Q represents an oxygen or a sulpur atom; and

X represents:

$$-(CH_2)_a(O)_b(\overset{O}{\overset{\|}{C}})_c(Y)_d-$$

in which:

Y represents an oxygen atom or a —$NR_6$-group wherein $R_6$ represents any of the values which $R_1$ may assume;

a is 0 or 1;

b is 0 or 1;

c is 1 or 2;

d is 0 or 1;

with the proviso that at least one of b or d is 1.

The groups $R_1$, $R_2$ and $R_4$ may each represent a substituted or unsubstituted hydrocarbyl or hydrocarbyloxy group: examples include unsubstituted or halo-substituted $C_1$ to $C_4$ alkyl, such as methyl or ethyl; unsubstituted or halo-substituted $C_6$ to $C_{10}$ aryl or aralkyl, such as phenyl or benzyl; and oxy analogues. In the case of $R_4$, increase in the size of the group increases the steric hindrance to the hydrolysable ester or amide function X and thereby increases the stability of the polymer. It is preferred, however, from the standpoint of ease of preparation and availability, that at least one, and preferable all, of $R_1$ $R_2$ and $R_4$ represents a hydrogen atom. The group $R_3$ may represent a mono- or poly- substituted ethylene group, preferably an unsubstituted ethylene group; that is, a dihydro(thia)pyran derivative.

Preferred such compounds are ethers; that is, those compounds of the above formula wherein Q represents an oxygen atom, especially dihydropyrans.

X may, as shown, represent any hydrolysable carboxylic acid ester, carbonate ester or oxalate ester function, or an amide analogue. Preferably, however, X represents —COO— or —$CH_2OCO$—.

Particularly preferred polymerisable cyclic ethers have the formula:

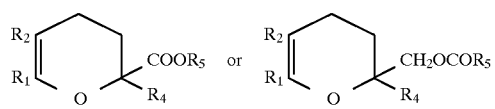

$R_5$ may suitably represent any group which can participate in cationic polymerisation; for example those derivable from monomers (a) to (e) mentioned hereinbefore. Preferred examples are vinyl (thio)ether and epoxy groups.

It is particularly preferred that $R_5$ represents a cyclic vinyl (thio)ether, especially of the formula:

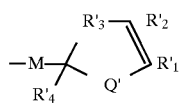

in which:

$R_1'$, $R_2'$, $R_3'$ and $R_4'$, which may be the same or different, represent any of the values which $R_1$, $R_2$, $R_3$ and $R_4$ may assume;

M represents the group —ZX'—;

Q' represents an oxygen or sulphur atom;

X' represents any of the values which X may assume; and

Z represents a single bond or a substituted or unsubstituted hydrocarbylene.

Especially preferred polymerisable cyclic ethers are the reaction products formed by subjecting one or a mixture of dihydropyran aldehydes to disproportionation by the Tischenko reaction; they have the formula:

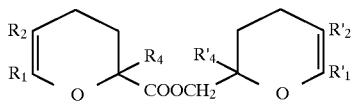

in which:

$R_1'$, $R_2'$ and $R_4'$, which may be the same or different, represent any of the values which $R_1$, $R_2$ and $R_4$ respectively may assume. A preferred such compound is acrolein tetramer (in which the $R_i$ all represent hydrogen atoms).

Polymerisable cyclic ethers wherein X comprises a —COO— or —CH$_2$OCO— group may conveniently be prepared from the tetramer of the corresponding unsaturated aldehyde produced by the Tischenko reaction; namely:

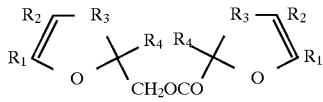

Thus, cyclic ethers wherein X comprises a —COO— group may be prepared by reaction of the tetramer with an alcohol $R_5$OH using a transesterification catalyst and reaction conditions:

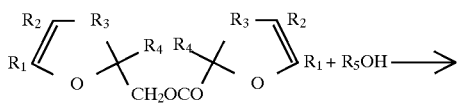

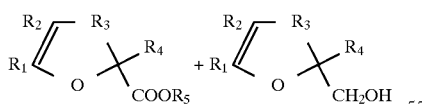

Cyclic ethers wherein X comprises a —CH$_2$OCO— group may be prepared by reaction of the tetramer with a lower alkyl carboxylic acid ester $R_5COOR_7$ in which $R_7$ represents a lower alkyl group using a transesterification catalyst and reaction conditions:

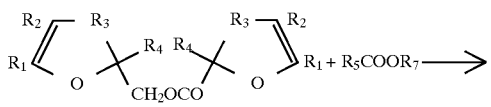

-continued

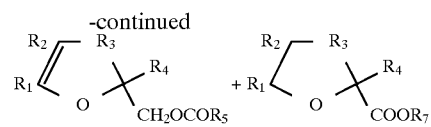

The respective by-products may also be transesterified with $R_5COOR_7$ or $R_5OH$ to give, correspondingly:

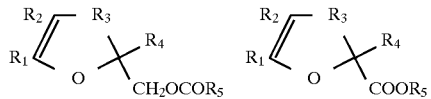

The corresponding amides may be prepared analogously.

Cyclic ethers where X comprises a —COO— group may also be obtained by mild oxidation of the dimer of the corresponding unsaturated aldehyde, followed by esterification of the salt, for example the silver salt.

Meta-carbonates and oxalates may be obtained, respectively, by esterification and transesterification:

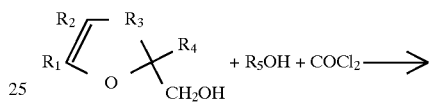

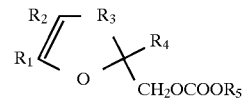

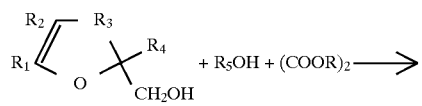

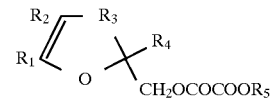

It is, however, to be stressed that acrolein tetramer is readily prepared from acrolein which is a commercially available material; can readily be purified; and has been found to be satisfactory in the practice of this invention.

Other specific examples of polymerisable cyclic ethers include bis-(3,4-dihydropyran-2-ylmethyl) succinate, bis-(3,4-dihydropyran-2-ylmethyl) o-terephthalate, bis-(3,4-dihydropyran-2-yl) adipate, bis-(3,4-dihydropyran-2-ylmethyl) adipate,

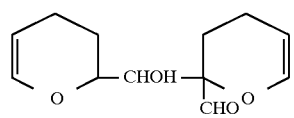

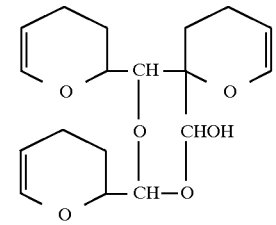

and

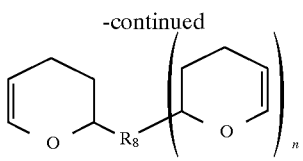

wherein:

n represents a number of at least one; and $R_8$ is a polyvalent organic bridging group which desirably does not contain a basic group since these can interfere with the acid catalysis required, as will be explained later, for the polymerisation.

A further class of addition polymerisation to which the present invention may also advantageously be applied is free radical addition polymerisation. Suitably the, or one of the, monomers comprises a vinyl- or vinylidene group-containing monomer, preferably a substituted or unsubstituted (meth)acrylate ester, especially a $C_1$ to $C_8$ alkyl methacrylate. Specific examples of such monomers include methylacrylate, ethyl acrylate, propyl acrylate, butyl acrylate, methyl methacrylate, ethyl methacrylate, propyl methacrylate, butyl methacrylate, n-hexyl methacrylate, ethyl hexyl methacrylate, lauryl methacrylate, phenyl acrylate, isodecyl methacrylate, 2-ethoxyethyl methacrylate, 2-n-butoxy ethyl methacrylate, 2-(2-ethoxyethoxy)ethyl methacrylate, 2-phenoxyethyl acrylate and 2-phenoxyethyl methacrylate. Such monomers require the presence of a bis- or tris-vinyl or vinylidene group-containing monomer as cross-linking agent. This may be a hydrocarbon, for example an unsubstituted or hydrocarbyloxylated aromatic hydrocarbon such as divinyl benzene. Preferably, however, the cross-linking agent comprises a bis- or tris- vinyl or vinylidene group-containing ester, particularly preferred examples being the bis-methacrylate ester of polyethylene glycol, the bis-methacrylate ester of ethylene glycol or triallyl cyanurate.

Cationically polymerisable monomers in classes (b) and (e) above may also be free radical polymerised. Of these, epoxides and episulphides are particularly versatile, being also susceptible to anionic addition polymerisation, for example with organometallic initiators. Suitable monoepoxides include the alkylens oxides such as ethylene oxide, propylene oxide and butylene oxides; the aromatic oxides such as styrene oxide. Polyepoxides include many commercially available (cyclo)aliphatic and aromatic polyepoxides, such as:

Analogous mono- and polyepisulphides may also be used, especially ethylene and propylene sulphides.

There are many classes of condensation polymerisation to which the present invention is applicable; for example, condensation polymerisations for the production of polyamides, polyesters, polycarbonates, phenol-formaldehydes, urea-formaldehydes, urea-melamines and polyurethanes, particularly the latter. In the preparation of polyurethanes according to the invention one of the monomers comprises a polyisocyanate, for example a diisocyanate such as a (cyclo)aliphatic, araliphatic or aromatic diisocyanate. Specific examples include 2,4, and 2,6 toluene diisocyanate; (cyclo)aliphatic diisocyanates such as 1,6-hexamethylene diisocyanate, isophorone diisocyanate, 4,4'-dicyclohexyl methane diisocyanate, and cyclohexylene 1,2- and 1,4- diisocyanate; and araliphatic diisocyanates such as 4,4'-diphenylmethane diisocyanate.

A versatile group of cross-linking agents, particularly for polyurethanes and also for cationically polymerisable species, such as the cyclic (thio)ethers, are monomers comprising at least three groups containing a reactive hydrogen atom such as a hydroxy, carboxy, amino or mercapto group (amino not being preferred for cationic polymerisation), for example those comprising at least three groups which are hydroxyl, and/or carboxyl groups.

Examples include polycarboxylic acids, polyhydric phenols, hydroxy acids and polyhydric alcohols, desirably those with less than 18, preferably less than 10, carbon atoms; for example aliphatic polyols such as glycerol, erythritol, pentaerythritol, sorbitol, dulcitol, inositol, 2-ethyl-2-hydroxy-methylpropane-1,3-diol and 1,2,6-hexanetriol; aromatic polyols such as 1,2,3-trihydroxybenzene, 1,2,4-trihydroxybenzene, 1,3,5-trihydroxybenzene; araliphatic polyols; hydroxy aliphatic, alicyclic and aromatic carboxylic acids, including Krebs cycle acids, such as citric acid, malic acid, tartaric acid, 2-hydroxy-3-methyl (D) succinic acid, ascorbic acid, 2,3,-dihydroxybenzoic acid, 2,4,-dihydroxy-benzoic acid, 2,5-dihydroxybenzoic acid, 2,6-dihydroxybenzoic acid, 2,3,4-trihydroxybenzoic acid, 2,4,5-trihydroxybenzoic acid, 2,4, 6-trihydroxybenzoic acid and 3,4,5-trihydroxybenzoic acid. Mixtures of polycarboxylic acids, polyhydric phenols, hydroxy acids and polyhydric alcoyols may be used. Preferably the polycarboxylic acids, polyhydric phenols, hydroxy acids and polyhydric alcohols are linear.

Monomers comprising two groups containing reactive hydrogen atoms as aforesaid, for example di-carboxy or hydroxy substituted monomers may be utilised, especially as

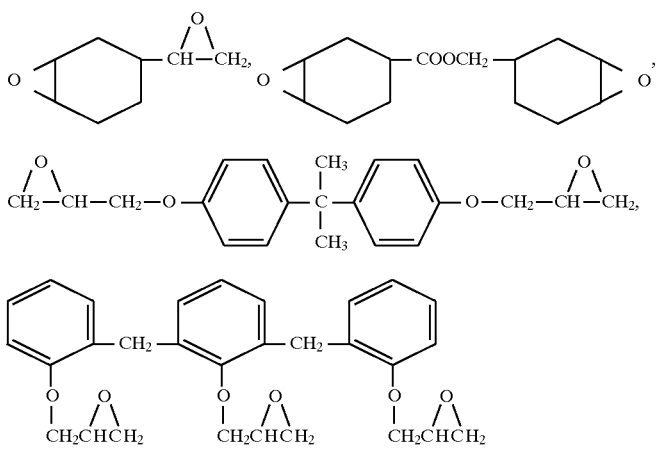

comonomers with cyclic(thio) ethers, epoxides or polyisocyanates, for example to produce polymers of the type disclosed in U.K. 1,572,598 and U.S. Pat. No. 4,221,779.

Examples of di-carboxy or hydroxy monomers include dicarboxylic acids, dihydric phenols, hydroxyacids, glycols and polyesters thereof, desirably those with less than 18, preferably less than 10, carbon atoms; for example oxalic, malonic, succinic, glutaric, and adipic acids, 1,2-cyclohexanedicarboxylic, 1,3-cyclohexanedicarboxylic and 1,4-cyclohexanedicarboxylic acids, phthalic, isophthalic and terephthalic acids, 4,4'-dihydroxyphenyl-2,2-propane, resorcinol, quinol and orsinol, lactic, 2-hydroxyisobutyric, 10-hydroxydecanoic, 12-hydroxyoctadecenoic, 12-hydroxy-cis-9-octadecenoic, 2-hydroxycyclohexane carboxylic, 2-hydroxy-2-phenyl (D) propionic, diphenylhydroxyacetic, 2-hydroxybenzoic, 3-hydroxy-benzoic and 4-hydroxybenzoic acids, glycol, propanediols and butanediols. Glycols are most suitable, especially the $C_2$ to $C_6$, preferably $C_2$ to $C_4$ glycols. Mixtures of dicarboxylic acids, dihydric phenols, hydroxy acids and glycols may be used. Preferably the dicarboxylic acids, dihydric phenols, hydroxy acids and glycols are linear.

Cationic addition polymerisation in accordance with this invention requires acid catalysis. Suitable Bronsted and Lewis acids include strong mineral acids which are not redox reagents under the reaction conditions such as hydrochloric and sulphuric acid, tosylic acid, brosylic acid and the adduct of methanol and boron trifluoride. Suitable Lewis acids include boron trifluoride and its etherate, boron tribromide, aluminium trichloride, aluminium tribromide, gallium trichloride, germanium tetrachloride, tin tetrabromide, zinc chloride and ferric chloride, ferric chloride being preferred. From 0.01% to 2%, particularly from 0.04% to 1%, based on the total weight of the reaction mixture may suitably be used.

In the case of the production of polyurethanes the, or one of the dihydroxy compounds may be a polyethylene oxide, preferably one wherein the ratio of number average weight to functionality is greater than 1000. The polyurethanes so produced are useful in the performance of the invention disclosed in GB.2047093 and GB.2047094.

It is the nature of the solvent, which may be a mixture of one or more compounds (including latent solvents) the composition of which may be varied, continuously or continually, as the polymerisation proceeds, which is a particularly critical feature of this invention. The solvent may qualitatively be assigned to one of three groups according to its hydrogen bonding capacity:

| GROUP | EXAMPLES |
|---|---|
| strongly hydrogen bonded | alcohols, acids, amines, aldehydes |
| moderately hydrogen bonded | ketones, esters, ethers, |
| poorly hydrogen bonded | hydrocarbons, chlorinated and nitrohydrocarbons, nitriles | from which the meaning of "same or adjacent hydrogen bonding group" will be apparent.

The solubility parameter (which is the square root of the cohesive energy density) of a number of solvents is given in Table 1 below. In Table 2 solubility parameter ranges are given for a number of bulk polymers. (Both from "Encyclopaedia of Polymer Science and Technology" published by John Wiley & Sons.)

TABLE I

| Solvents | Solubility parameter |
|---|---|
| Hydrocarbons | |
| aliphatic | |
| n-pentane | 7.05 |
| isopentane | 7.05 |
| n-hexane | 7.3 |
| cyclohexane | 8.2 |
| n-heptane | 7.45 |
| n-octane | 7.55 |
| isooctane | 6.85 |
| n-nonane | 7.65 |
| n-decane | 7.75 |
| n-tetradecane | 7.95 |
| butadiene | 6.7 |
| isoprene | 7.25 |
| aromatic | |
| benzene | 9.15 |
| toluene | 8.9 |
| o-xylene | 9.0 |
| m-xylene | 8.8 |
| p-xylene | 8.75 |
| ethylbenzene | 8.8 |
| naphthalene | 9.9 |
| n-propylbenzene | 8.65 |
| isopropylbenzene | 8.86 |
| mesitylene | 8.8 |
| p-cymene | 9.85 |
| styrene | 8.66 |
| Perfluoro compounds | |
| n-perfluorobutane | 5.2 |
| n-perfluoropentane | 5.5 |
| n-perfluorohexane | 5.6 |
| n-perfluoroheptane | 5.7 |
| n-perfluorononane | 5.7 |
| perfluorocyclobutane | 5.7 |
| perfluorocyclohexane | 6.0 |
| Perfluoro compounds | |
| perfluorobenzene | 8.1 |
| perfluorotoluene | 7.7 |
| Halogen compounds | |
| aliphatic chlorides | |
| dichloromethane | 9.7 |
| chloroform | 9.3 |
| carbon tetrachloride | 8.6 |
| ethyl chloride | 8.5 |
| 1,1-dichloroethane | 9.1 |
| 1,2-dichloroethane | 9.8 |
| 1,1,1-trichloroethane | 8.5 |
| tetrachloroethane | 10.4 |
| iobutyl chloride | 8.2 |
| t-butyl chloride | 7.9 |
| unsaturated chlorides | |
| cis-dichloroethylene | 9.7 |
| trans-dichloroethylene | 9.2 |
| trichloroethylene | 9.2 |
| tetrachloroethylene | 9.35 |
| vinyl chloride | 8.7 |
| vinylidene chloride | 8.6 |
| chloroprene | 9.3 |
| aromatic compounds | |
| chlorobenzene | 9.5 |
| bromobenzene | 10.0 |
| iodobenzene | 11.3 |
| o-bromotoluene | 9.8 |
| aliphatic bromides | |
| methyl bromide | 9.4 |
| bromoform | 10.5 |
| ethyl bromide | 8.9 |
| 1,2-dibromoethane | 10.4 |
| 1,1,2,2-tetrabromoethane | 10.3 |
| 1,2,3-tribromopropane | 10.7 |
| aliphatic iodides | |
| methyl iodide | 9.9 |
| diiodomethane | 11.8 |

TABLE I-continued

| Solvents | Solubility parameter |
|---|---|
| ethyl iodide | 9.4 |
| Hydroxyl compounds | |
| water | 23.2 |
| phenol | 14.5 |
| glycol | 15.7 |
| glycerol | 16.5 |
| cyclohexanol | 11.4 |
| methanol | 14.5 |
| ethanol | 12.7 |
| n-propanol | 11.9 |
| n-butanol | 11.4 |
| isobutyl alcohol | 10.7 |
| n-amyl alcohol | 10.9 |
| n-hexanol | 10.7 |
| n-heptanol | 10.0 |
| n-octanol | 10.3 |
| Acids | |
| acetic acid | 12.6 |
| n-butyric acid | 11.5 |
| isovaleric acid | 10.9 |
| n-valeric acid | 10.8 |
| Esters | |
| methyl formate | 10.7 |
| ethyl formate | 9.4 |
| methyl acetate | 9.6 |
| ethyl acetate | 9.1 |
| n-propyl acetate | 8.75 |
| isopropyl acetate | 8.6 |
| ethyl propionate | 8.9 |
| amyl formate | 8.65 |
| n-butyl acetate | 8.55 |
| ethyl n-butyrate | 8.15 |
| amyl acetate | 8.45 |
| butyl propionate | 8.5 |
| ethyl isovalerate | 8.65 |
| amyl propionate | 8.4 |
| n-butyl n-butyrate | 8.0 |
| isobutyl isobutyrate | 7.7 |
| isoamyl butyrate | 8.5 |
| ethyl benzoate | 9.7 |
| diethyl carbonate | 8.8 |
| diethyl malonate | 10.3 |
| ethylene carbonate | 14.5 |
| diethyl phthalate | 10.05 |
| vinyl acetate | 8.7 |
| methyl acrylate | 8.9 |
| ethyl acrylate | 8.4 |
| methyl methacrylate | 8.7 |
| ethyl methacrylate | 8.4 |
| n-butyl acrylate | 8.9 |
| n-butyl methacrylate | 8.2 |
| isobutyl methacrylate | 7.9 |
| Aldehydes | |
| benzaldehyde | 10.8 |
| acetaldehyde | 9.8 |
| n-heptaldehyde | 9.7 |
| Ketones | |
| acetone | 10.0 |
| methyl ethyl ketone | 9.3 |
| diethyl ketone | 8.8 |
| methyl n-propyl ketone | 8.7 |
| methyl n-butyl ketone | 8.6 |
| methyl amyl ketone | 8.5 |
| methyl hexyl ketone | 8.45 |
| cyclohexanone | 9.9 |
| Ethers | |
| diethyl ether | 7.4 |
| diisopropyl ether | 7.0 |
| β, β'-dichloroethyl ether | 9.8 |
| dioxane | 10.0 |
| tetrahydrofuran | 9.9 |
| Amines | |
| di-n-butylamine | 7.85 |
| aniline | 10.8 |
| pyridine | 10.7 |
| Amides | |
| formamide | 17.8 |
| acetamide | 16.7 |
| dimethylformamide | 12.1 |
| dimethylacetamide | 11.1 |
| Nitriles | |
| acetonitrile | 11.9 |
| propionitrile | 10.7 |
| n-butyronitrile | 10.5 |
| n-valeronitrile | 10.1 |
| capronitrile | 10.2 |
| malonitrile | 15.1 |
| acrylonitrile | 10.45 |
| methacrylonitrile | 9.1 |
| Nitro compounds | |
| nitromethane | 12.6 |
| nitroethane | 11.1 |
| 1-nitropropane | 10.2 |
| 2-nitropropane | 9.9 |
| nitrobenzene | 10.0 |
| o-nitrotoluene | 10.5 |
| m-nitrotoluene | 10.4 |
| Sulfur compounds | |
| carbon disulfide | 10.0 |
| ethyl mercaptan | 8.65 |
| dimethyl sulfide | 9.0 |
| diethyl sulfide | 8.8 |
| thiophene | 9.8 |
| dimethyl sulfone | 14.6 |
| diethyl sulfone | 12.5 |
| dipropyl sulfone | 11.3 |
| dimethyl sulfoxide | 13.4 |

TABLE 2

| Polymers | Manufacturer | Solubility Parameter | | |
|---|---|---|---|---|
| | | Poor | Moderate | Strong |
| Acrylics | | | | |
| acrylic solution polymers | | | | |
| Acryloid B-44 | Rohm & Haas | 8.9–11.9 | 8.5–13.3 | 0 |
| Acryloid B-66 | Rdhm & Haas | 8.5–11.1 | 7.8–12.1 | 0 |
| Acryloid B-72 | Rohm & Haas | 8.5–12.7 | 8.9–13.3 | 0 |
| Acryloid B-82 | Rohm & Haas | 8.5–11.1 | 8.9–12.1 | 0 |
| poly(butyl acrylate) | Rohm & Haas | 7.0–12.7 | 7.4–12.1 | 9.5–12.7 |
| poly(methacrylic acid) | Rohm & Haas | 0 | 9.9 | 12.7–14.5 |
| poly(methyl methacrylate) | Rohm & Haas | 8.9–12.7 | 8.5–13.3 | 0 |
| poly(ethyl methacrylate) | Rohm & Haas | 8.5–11.1 | 7.8–13.3 | 9.5–11.4 |
| poly(n-butyl methacrylate) | Rohm & Haas | 7.4–11.1 | 7.4–9.9 | 9.5–11.4 |
| poly(isobutyl methacrylate) | Rohm & Haas | 8.5–11.1 | 8.5–9.9 | 9.5–11.4 |
| Alkyd resins | | | | |
| 30% soy, glycerol phthalate | | 8.5–12.7 | 8.5–14.7 | 0 |
| 45% soy, glycerol phthalate | | 7.0–11.1 | 7.4–10.8 | 9.5–11.9 |
| 45% soy, pentaerythritol phthalate | | 7.0–11.1 | 7.4–10.8 | 9.5–11.9 |
| 45% linseed, glycerol phthalate | | 7.0–11.9 | 7.4–10.8 | 9.5–11.9 |
| Epoxy resins | | | | |
| bisphenol A-epichlorohydrin condensates | | | | |
| Epon E-72 | Shell Chemical | 8.5–10.6 | 7.4–9.9 | 9.5–11.4 |
| Epon 812 | Shell Chemical | 8.9–12.7 | 7.8–14.7 | 10.0–14.5 |
| Epon 864 | Shell Chemical | 9.5–12.7 | 8.5–14.7 | 0 |
| Epon 1001 | Shell Chemical | 10.6–11.1 | 8.5–13.3 | 0 |
| Epon 1004 | Shell Chemical | 0 | 8.5–13.3 | 0 |
| Epon 1007 | Shell Chemical | 0 | 8.5–13.3 | 0 |
| Epon 1009 | Shell Chemical | 0 | 8.5–9.9 | 0 |
| Hydrocarbon resins | | | | |
| cyclized rubber | Reichhold | 7.4–10.6 | 7.8 | 0 |
| Alpex cyclized rubber | | | | |
| hydrocarbon resin | | | | |
| Gilsonite Brilliant Black | American Gilsonite | 7.8–10.6 | 7.8–8.5 | 0 |
| Gilsonite Selects | American Gilsonite | 7.8–9.5 | 7.8–8.5 | 9.5 |
| Nebony 100 | Neville Chemical | 8.5–10.6 | 7.8–9.9 | 0 |
| Neville LX685 | Neville Chemical | 7.4–10.6 | 9.3–9.9 | 0 |
| Panarez 3-210 | Amoco Chemical | 8.5–10.6 | 0 | 0 |
| Petrolatum 125 IIMP | | 8.5–8.9 | 0 | 0 |
| natural rubber | | | | |
| Pliolite NR | Goodyear | 85.–10.6 | 0 | 0 |
| Pliolite P-1230 | Goodyear | 9.5–10.6 | 0 | 0 |
| Phenolic resin | | | | |
| p-phenylphenol resin | Union Carbide | 8.5–10.0 | 7.8–13.3 | 9.5–10.8 |
| Bakelite CKR-525/4 | | | | |
| phenolic resin | | | | |
| Bakelite CKR-5360 | Union Carbide | 8.5–11.1 | 7.8–13.3 | 9.5–11.4 |
| Bakelite CKR-2400 | Union Carbide | 8.9–11.9 | 7.8–13.3 | 9.5–11.5 |
| Bakelite BKR2620 | Union Carbide | 0 | 8.4–14.7 | 9.5–14.5 |
| terpene-phenol resin | Hooker Chemical | 8.5–10.6 | 7.8–9.8 | 9.5–11.4 |
| Durez 220 | | | | |
| phenolic resin | Hooker Chenical | 7.0–11.9 | 7.4–9.8 | 9.5–14.5 |
| Durez 550 | | | | |
| phenol ether resin | General Electric | 0 | 8.9–12.1 | 0 |
| Methylon 75202 | | | | |
| Polyesters | | | | |
| linear polyester | Goodyear | 11.1 | 9.9 | 0 |
| Vitel resin PE100-X | | | | |
| poly(ethylene terephthalate) | | | | |
| soluble Hylar 49000 | Du Pont | 10.6–11.1 | 10.6–11.1 | 0 |
| soluble Hylar 49001 | Du Pont | 8.9–10.6 | 9.3–9.9 | 0 |
| soluble Hylar 49002 | Du Pont | 9.5–10.6 | 9.3–9.9 | 0 |
| Amino resins | | | | |
| urea-formaldehyde resin | Reichhold | 9.9–11–1 | 8.5–10.8 | 9.5–12.7 |
| Beckamine P-196 | | | | |

TABLE 2-continued

| Polymers | Manufacturer | Solubility Parameter | | |
|---|---|---|---|---|
| | | Poor | Moderate | Strong |
| butylated urea-formaldehyde resin Beetle 227-8 | American Cyanamid | 0 | 0 | 8.9–11.4 |
| butylated melamine-fomaldehyde resin Resunene 888 | Monsanto | 8.5–10.6 | 7.4–12.1 | 9.5–12.7 |
| benzoguanamine-formaldehyde resin Uformite MX-61 | Rohm & Haas | 8.5–11.1 | 7.4–11.1 | 9.5–11.1 |
| Cellulose derivatives | | | | |
| cellulose acetate, LL-1 | | 11.1–12.7 | 9.9–14.7 | 0 |
| cellulose acetate butyrate | | 11.1–12.7 | 8.5–14.7 | 12.7–14.5 |
| cellulose butyrate, 0.5 sec | | 11.1–12.7 | 8.5–14.7 | 12.7–14.5 |
| cyanoethylcellulose | | 11.1–12.7 | 12.2–14.7 | 0 |
| ethylcellulose, K-200 | | 0 | 8.5–10.8 | 9.5–11.4 |
| ethylcellulose, N-22 | | 8.1–11.1 | 7.4–10.8 | 9.5–14.5 |
| ethylcellulose, T-10 | | 8.5–9.5 | 7.8–9.8 | 9.5–11.4 |
| cellulose nitrate, RS, 25 cps | | 11.1–12.7 | 7.8–14.7 | 14.5 |
| cellulose nitrate, SS, 0.5 sec | | 11.1–12.7 | 7.8–14.7 | 12.7–14.5 |
| Polyamides | | | | |
| methylolpolyamide nylon, type 8 | Du Pont | 0 | 0 | 11.9–14.5 |
| dimer acid-polyamine condensates | | | | |
| Versamid 100 | General Mills | 8.5–10.6 | 8.5–8.9 | 9.5–11.4 |
| Versamid 115 | General Mills | 8.5–10.6 | 7.8–9.9 | 9.5–12.7 |
| Versamid 900 | General Mills | 0 | 0 | 0 |
| Versamid 930 | General Mills | 0 | 0 | 9.5–11.4 |
| Versamid 940 | General Mills | 0 | 0 | 9.5–11.4 |
| Versalon 1112 | General Mills | 0 | 0 | 9.5–11.4 |
| Versalon 1175 | General Mills | 0 | 0 | 9.5–11.4 |
| Rosin derivatives | | | | |
| WW gum rosin | | 8.5–11.1 | 7.4–10.8 | 9.5–11.4 |
| wood rosin M grade | | 7.4–10.6 | 7.4–10.8 | 9.5–14.5 |
| ester gum | | 7.0–10.6 | 7.4–10.8 | 9.5–10.9 |
| Alkydol 160 | Reichhold | 9.5 | 8.5–10.8 | 9.5–12.7 |
| rosin-modified phenol-formaldehyde Amberol F-7 | Rohm & Haas | 8.5–10.6 | 7.8–9.8– | 9.5–10.9 |
| maleic rosin type | | | | |
| Amberol 750 | Rohm & Haas | 0 | 8.9–10.8 | 9.5–12.7 |
| Amberol S01 | Rohm & Haas | 8.5–11.1 | 7.4–9.9 | 0 |
| Arochem 455 | U.S. Industrial Chemicals | 0 | 7.8–13.3 | 9.5–14.5 |
| Arochem 462 | U.S. Industrial Chemicals | 9.5 | 8.5–10.8 | 9.5–14.5 |
| polymerized rosin Dymerex | Hercules | 7.4–10.6 | 7.8–9.9 | 9.5–11.4 |
| Nelio B952 | Glidden | 9.5–10.6 | 7.4–10.8 | 9.5–12.7 |
| Nelio VBR757 | Glidden | 0 | 8.5–10.8 | 9.5–14.5 |
| rosin-derived alkyd Neolyn 23 | Hercules | 8.5–11.1 | 8.5–13.3 | 0 |
| α-pinene resin Newport V-40 | Tenneco | 8.5–11.1 | 7.4–12.1 | 9.5–14.5 |
| pentaerythrytol ester of rosin Pentalyn A | Hercules | 8.5–10.6 | 7.4–9.9 | 9.5–11.4 |
| maleic-modified pentaerythrytol ester of rosin Pentalyn G | Hercules | 8.5–10.6 | 7.8–9.9 | 9.5–10.9 |
| pentaerythrytol ester of dimerized rosin Pentalyn K | Hercules | 8.5–10.6 | 7.8–9.9 | 9.5 |
| rosin-based polymers | | | | |
| Pentalyn 830 | Hercules | 8.5–9.5 | 7.8–10.8 | 9.5–11.4 |
| Pentalyn 856 | Hercules | 8.5–11.1 | 7.4–10.8 | 9.5–11.4 |
| Vinsol | Hercules | 10.6–11.9 | 7.8–13.3 | 9.5–12.7 |
| Styrene polymers and copolymers | | | | |
| butadiene-styrene | | | | |
| Buton 100 | Enjay | 7.4–10.6 | 7.4–9.9 | 0 |
| Buton 300 | Enjay | 8.5–10.6 | 7.4–9.9 | 9.5–10.5 |
| styrene-maleic anhydride | | | | |
| Lytron 810 | Nonsanto | 11.9 | 9.9–14.7 | 0 |

TABLE 2-continued

| Polymers | Manufacturer | Solubility Parameter | | |
| --- | --- | --- | --- | --- |
| | | Poor | Moderate | Strong |
| Lytron 820 | Monsanto | 9.5 | 8.9–14.7 | 10.9–14.5 |
| styrene copolymer | Marbon | 8.5–10.6 | 9.3–9.9 | 0 |
| Marbon 9200 | | | | |
| styrene-acrylonitrile-indene terpolymer | Penn. Industrial | 8.5–11.1 | 7.8–9.9 | 0 |
| Piccoflex 120 | | | | |
| modified polystyrenes | | | | |
| Styron 440M-27 | Dow | 8.5–10.6 | 9.3 | 0 |
| Styron 475M-27 | Dow | 8.5–10.6 | 9.3 | 0 |
| Styron 480-27 | Dow | 9.5–10.6 | 9.3 | 0 |
| rubber-modified polystyrene | Monsanto | 8.5–10.6 | 9.3 | 0 |
| Lustrex "High Test 88" | | | | |
| Shell X-450 | Shell Chemical | 9.5–10.6 | 8.5–12.1 | 9.5–12.7 |
| styrene-acrylonitrile copolymer | Union Carbide | 10.6–11.1 | 9.3 | 0 |
| Bakelite RMD4511 (S/An) | | | | |
| Vinyl resins | | | | |
| poly(vinyl chloride) | | | | |
| Exon 470 | Firestone | 8.5–11.1 | 7.8–9.9 | 0 |
| Exon 471 | Firestone | 8.5–11.1 | 7.8–12.1 | 0 |
| Exon 473 | Firestone | 8.5–11.1 | 7.8–9.9 | 0 |
| Geon 121 | Goodrich | 10.6–11.1 | 9.3–9.9 | 0 |
| vinylidene chloride-acrylonitrile | | | | |
| poly(vinyl butyl ether) | | 7.8–10.6 | 7.4–9.9 | 9.5–11.4 |
| poly(vinyl ethyl ether) | | 7.0–11.1 | 7.4–10.8 | 9.5–14.5 |
| poly(vinyl formal) | | | | |
| Formvar 7/70F | Shawinigan | 0 | 9.9–13.3 | 0 |
| Formvar 15/95E | Shawinigan | 0 | 9.9–13.3 | 0 |
| poly(vinyl isobutyl ether) | | 7.0–10.6 | 7.4–9.9 | 9.5–11.4 |
| vinylidene chloride-acrylonitrile | | | | |
| copolymer | | | | |
| Saran F-120 | Dow | 9.5–11.1 | 12.1–14.7 | 0 |
| Saran F-220 | Dow | 9.5–11.1 | 10.8–14.7 | 0 |
| poly(vinyl acetate) | Union Carbide | 8.9–12.7 | 8.5–14.7 | 14.5 |
| Vinylite AYAA | | | | |
| partially hydrolyzed vinyl chloride-vinyl | Union Carbide | 10.6–11.1 | 7.8–9.9 | 0 |
| acetate copolymer | | | | |
| Vinylite VAGII | Union Carbide | 10.6–11.1 | 7.8–12.1 | 0 |
| vinyl chloride-vinyl acetate copolymer | | | | |
| Vinylite VYIIII | | | | |
| vinyl chloride-vinyl acetate-maleic acid | Union Carbide | 9.3–11.1 | 7.8–13.3 | 0 |
| terpolymer | | | | |
| Vinylite VMCH | | | | |
| vinyl chloride copolymer | Union Carbide | 0 | 8.9–10.8 | 9.5–14.5 |
| Vinylite VXCC | | | | |
| vinyl chloride-vinyl acetate copolymer | Union Carbide | 0 | 8.9–10.8 | 9.5–14.5 |
| Vinylite VYLF | | | | |
| poly(vinyl butyral) | | | | |
| Vinylite XYHL | Union Carbide | 9.5–11.1 | 7.8–13.2 | 0 |
| Vinylite XYSG | Union Carbide | 9.5–11.1 | 7.8–13.2 | 0 |
| poly(ethylene-co-vinyl acetate) | | | | |
| Elvax 150 | Du Pont | 7.8–10.6 | 0 | 0 |
| Elvax 250 | Du Pont | 8.5–9.5 | 0 | 0 |
| Elvax EOD 3602-1 | Du Pont | 7.8–10.6 | 7.8–8.5 | 0 |
| Miscellaneous | | | | |
| synthetic oil | Reichhold | 7.0–11.1 | 7.4–9.9 | 9.5–11.4 |
| Beckolin 27 (modified oil) | | | | |
| poly(oxyethylene)glycol | Union Carbide | 8.9–12.7 | 8.5–14.7 | 9.5–14.5 |
| Carbowax 4000 | | | | |
| chlorinated rubber | | 8.5–10.6 | 7.8–10.8 | 0 |
| hydrocarbon mixture | Conoco | 7.0–11.1 | 7.4–9.9 | 9.5–11.4 |
| Conoco H-35 | | | | |
| dammar gum (dewaxed) | | 8.5–10.6 | 7.8–9.9 | 9.5–10.9 |
| chlorosulfonated polyethylene | | | | |
| Hypalon 20 | Du Pont | 8.1–9.8 | 8.4–8.8 | 0 |
| Hypalon 30 | Du Pont | 8.5–10.6 | 7.8–8.5 | 0 |
| polygene-bisphenol A condensate | General Electric | 9.5–10.6 | 9.3–9.9 | 0 |

TABLE 2-continued

| Polymers | Manufacturer | Solubility Parameter | | |
| --- | --- | --- | --- | --- |
| | | Poor | Moderate | Strong |
| polycarbonate Lexan 100, 105 | | 10.6–12.7 | 7.8–14.7 | 9.5 |
| arylsulfonamide-formaldehyde condensate Santolite MHP | Monsanto | | | |
| shellac (pale-pale) | | 0 | 9.9–10.8 | 9.5–14.5 |
| silicone polymers | | | | |
| Silicone DC-23 | Dow-Corning | 7.4–8.5 | 7.4–7.8 | 9.5–10.0 |
| Silicone DC-1107 | Dow-Corning | 7.0–9.5 | 9.9–10.8 | 9.5–11.4 |
| methoxylated partial hydrolyzate of phenyl- and phenylmethylsilanes Sylkyd 50 | Dow-Corning | 7.0–12.7 | 7.9–12.9 | 9.5–14.5 |
| monophenyl polysilaxanol Silicone Intermediate Z6018 | Dow-Corning | 8.5–11.1 | 7.9–12.2 | 10.0–11.4 |
| soy oil | | 7.0–11.1 | 7.4–10.8 | 9.5–11.9 |
| soy oil, blown | | 7.0–11.1 | 7.4–10.8 | 9.5–12.7 |
| p-toluenesulfonamide-formaldehyde | | 11.8 | 9.9–14.7 | 12.7–14.5 |

In practice, an appropriate solvent for the performance of the present invention may readily he selected by first bulk polymerising the monomer mixture to a solid mass and then determining the swellability of portions of that mass in a number of solvents. Those solvents which swell it in excess of 100 pph of polymer will he suitable for the performance of the present invention, provided that they do not contain reactive groups which will interfere with the polymerisation. To obtain high molecular weight cross-linked particles which are capable of forming sols in the solvent, it is desirable to maintain a thermodynamically good solvent at all stages of the reaction.

Specific solvents whose use in the polymerisation of cyclic (thio)ethers and (meth)acrylate esters has been found desirable comprise one or more $C_1$ to $C_4$ alkyl acetates, especially methyl acetate and/or ethyl acetate. In the case of the polymerisation of epoxides or episulphides one or more halogenated hydrocarbons such as methylene chloride and/or chloroform were found very suitable. In the case of the polymerisation of polyisocyanates a mixture of one or more sulphoxides with one or more ketones, or chloroform, were found very suitable.

It is an important advantage of this invention that the polymerisation system does not require the presence, as is generally the case with non-aqueous dispersion or aqueous emulsion polymerisations, of an added stabiliser.

The polymerisation in accordance with this invention may be monitored, particularly at laboratory or pilot plant scale, by observing whether an aliquot of the reactant mixture spread onto a glass slide will form a coherent film. Provided that the solvent has been selected in the manner hereinhefore defined, the formation of coherent films occurs well before gelation.

When a coherent film is formed, or when other monitoring suggests, the polymerisation is terminated before gelation. For polymerisations which occur at elevated temperatures this may be achieved by cooling. Alternatively, polymerisation quenching agents may be added: base for cationic addition polymerisation; weak acids for anionic addition polymerisation; and free radical traps such as alkylated phenolic or quinonoid inhibitors for free radical polymerisation.

According to a further aspect, this invention provides a polymeric material having a weight average molecular weight from 5,000 to 20,000,000 and comprising cross-linked particles which are capable of forming a sol whenever prepared by the process herein described. More particularly, this invention provides a polymeric material having a weight average molecular weight from 5,000 to 20,000,000 comprising particles of a homo- or copolymer of a substituted or unsubstituted (meth)acrylate ester cross-linked by a bis- or tris- vinyl or vinylidene group-containing ester which are capable of forming a sol in a solvent which (a) has a solubility parameter from 2.5 $cal^{1/2}$ $ml^{-3/2}$ below to 1.0 $cal^{1/2}$ $ml^{-3/2}$ above the solubility parameter of the bulk polymeric material and (b) is of the same or adjacent hydrogen bonding group as the bulk polymeric material, especially wherein the cross-linking ester comprises the bis-methacrylate ester of polyethylene glycol, the bis-methacrylate ester of ethylene glycol or triallyl cyanurate. This invention also provides a polymeric material having a weight average molecular weight from 5,000 to 20,000,000 comprising cross-linked particles of a homo- or copolymer of a polymerisable cyclic (thio)ether which are capable of forming a sol in a solvent which (a) has a solubility parameter from 2.5 $cal^{1/2}$ $ml^{-3/2}$ below to 1.0 $cal^{1/2}$ $ml^{-3/2}$ above the solubility parameter of the bulk polymeric material and (b) is of the same or adjacent hydrogen bonding group as the bulk polymeric material, especially wherein the cyclic (thio)ether comprises acrolein tetramer. This invention further provides a polymeric material having a weight average molecular weight from 5,000 to 20,000,000 comprising cross-linked particles of a homo-or copolymer of an epoxide or episulphide which are capable of forming a sol in a solvent which (a) has a solubility parameter from 2.5 $cal^{1/2}$ $ml^{-3/2}$ below to 1.0 $cal^{1/2}$ $ml^{-3/2}$ above the solubility parameter of the bulk polymeric material and (b) is of the same or adjacent hydrogen bonding group as the bulk polymeric material. This invention also provides polymeric material having a weight average molecular weight from 5,000 to 20,000,000 comprising cross-linked particles of a homo- or copolymer of a polyisocyanate which are capable of forming a sol in a solvent which (a) has a solubility parameter from 2.5 $cal^{1/2}$ $ml^{-3/2}$ below to 1.0 $cal^{1/2}$ $ml^{-3/2}$ above the solubility parameter of the hulk polymeric material and (b) is of the same or adjacent hydrogen bonding group as the hulk polymeric material.

By selecting the solvent in accordance with this invention gelation, which in prior art processes rapidly follows the formation of the aforesaid cross-linked, sol-forming particles, is delayed for a sufficient period to enable the termination to he effected in a controlled manner. The sol-forming particles so produced have a very small particle size in the colloidal or sub-colloidal size range; that is an average primary particle size no greater than $0.2\mu$.

The reacted solutions so formed can either be used as such, in concentrated form, or the polymer can he recovered. Recovery can he effected by solvent evaporation or mixing, either by addition or reverse addition, with an excess of a non-solvent. A particularly desirable feature of the invention is that the polymer produced by addition of excess nonsolvent is typically a flowable powder, generally of fine particle size. Moreover, the polymer powder can readily he redissolved in the same or other solvent selected in accordance with this invention. It is believed that the polymer particles are globular when in solution and it is found that they typically contribute little to the viscosity of the solution until their swollen phase volume exceeds a critical fraction of the whole which, in practice, means that the polymer solution can he concentrated to about 20%, and sometimes to about 30%, by weight and still he readily pourable.

The polymer powders of this invention are useful as industrial and pharmaceutical compression moulding materials. They may be used in admixture with an active substance; for example, a pharmaceutical, bacteriostat, viruscide, insecticide, herbicide, larvicide, fungicide, algaecide, nematocide, topical or dermatological agent, antifoulant for marine growth prevention, enzyme, preservative, fluorescent or other pigment. The polymer powders of this invention are particularly useful as pharmaceutical tableting excipients, especially as direct compression tableting excipients. This is particularly the case for polymers prepared from cyclic (thio)ethers, such as acrolein tetramer. The active substance may be incorporated by admixing solid active substance, for example pharmaceutical or pigment, for example before tableting or the active substance may be added to a solution of the polymer, coprecipitated therewith and then tableted. In the latter case the swollen sol particles permit the active substance to penetrate the polymer network. The polymer powders are also useful as additives for hulk rubbers, sound damping formulations, viscosity control additives.

This invention also provides a polymeric material as herein defined which is dissolved in a solvent which is different from the reaction solvent. This solvent may comprise one or more monomers which may he reactive with the polymeric material. Desirably, at least one of the monomers is a (meth)acrylate ester styrene, alkyl styrene, vinyl chloride or acrylonitrile.

This invention also provides a surface coating composition such as an adhesive paint, varnish or lacquer, especially alkyl and acrylic based surface coatings, which comprise a polymeric material, which may comprise pigment introduced as aforesaid, especially one in a solvent which is different from the reaction solvent as aforesaid. This invention further provides a cured such surface coating composition; such materials typically have a reduced drying time, generate less heat and reduce shrinkage. It is to be noted that even if the solvent monomers do not interpolymerise with the polymeric material of this invention they will penetrate the polymer network and their resultant homopolymers will hind the polymer particles by entanglement.

EXAMPLE 1

1.924 1g (0.0086 mols) of acrolein tetramer were added to 0.5379 g (0.0057 mols) of glycerol containing 2% by weight of $FeCl_3$ in a reaction vessel equipped with a nitrogen bleed and a drying tube to exclude moisture. 3.30 $cm^3$ of methyl acetate were added to form a mixture which, initially, was not homogeneous. The mixture was continuously stirred and heated on a water bath whereupon it became homogeneous after about 15 minutes and was permitted to reflux.

Aliquots of the reactant mixture spread onto a slide began to produce solid film after 70 minutes from the beginning of reflux. The solution was then neutralised with triethylamine after 73 minutes of reaction, $1.3 \times 10^{-4}$ mols of triethylamine being required for the neutralisation.

The concentration of polymer in the solution was 8.2% by weight. It was possible to concentrate the polymer solution after neutralisation to about 24% by weight by distilling the excess methyl acetate or by using a rotary evaporator.

Polymer powder was obtained from the solution either by a film spreading technique or by precipitating the polymer solution by gradual addition to an excess of hexane.

EXAMPLE 2

1.9876 g (0.0089 mol) of acrolein tetramer were added to 1.0703 g (0.012 mol) of glycerol containing 2% by weight of $FeCl_3$, in a reaction vessel equipped as in Example 1. 4 $cm^3$ of methyl acetate were added to form a mixture which became homogeneous after about 15 minutes of stirring and heating. The mixture was refluxed for one hour then a further amount (1.91889 g; 0.0086 mols) of acrolein tetramer was added, along with 56 mol of methylene chloride so that the ratio methyl acetate:methylene chloride was approximately 7:93 by volume and the ratio acrolein tetramer glycerol was 3:2. The refluxing was continued and after 90 minutes from commencing refluxing a film began to form when the solution was spread on a glass slide. The mixture was neutralised after 100 minutes by adding triethylamine.

The concentration of polymer in the solution was 8.3% by weight. The polymer solution could he concentrated to about 24% by weight either by distillation or using a rotary evaporator.

Polymer powder was obtained as described in Example 1.

Using essentially the same preparative technique, copolymers with acrolein tetramer:glycerol weight ratios 70:30, 72:28, 74:26 and 76:24 were also prepared. These copolymers usually had lower molecular weights than the 3:2 copolymer produced in this and Example 1 above.

EXAMPLE 3

The preparation was carried out in two stages:
(a) Master hatch preparation

A master hatch of citric acid and acrolein tetramer in ethyl acetate was prepared for use in the preparation of citric acid acrolein tetramer copolymer. The ratio acrolein tetramer:citric acid in the master batch was stoichiometric (2 mols of acrolein tetramer to 1 mol of citric acid on the assumption that the three carboxylic groups and one hydroxyl group in citric acid would react). 35.0965 g (0.1567 mols) of acrolein tetramer were added to 15.0506 g citric acid (0.0783 mols), and the mixture was then added to 450 $cm^3$ of ethyl acetate.

The mixture was next placed in a round-bottom flask and refluxed with continuous stirring under a nitrogen bleed. The refluxing and stirring was stopped after half an hour to provide a homogeneous prepolymer which formed only a low molecular weight tacky film. The notional concentration of acrolein tetramer and citric acid was 10% w/v.
(b) Preparation of the copolymer 200 $cm^3$ of methylene chloride were added to 100 $cm^3$ of the master hatch together with 10 $cm^3$ of 0.3%, $FeCl_3$ solution in methylene chloride. The contents were then stirred at room temperature. After 30 minutes the mixture became cloudy and a solid film-producing solution was formed. The reaction was then terminated by adding triethylamine after one hour of stirring in both stages (a) and (b) combined. Soon after the addition of triethylamine the mixture became very cloudy.

The polymer concentration was 3.5% w/v and could be concentrated to about 10% w/v using a rotary evaporator.

Polymer powder was obtained by precipitation by gradually adding the solution to an excess of hexane.

EXAMPLE 4

Copolymers of acrolein tetramer/citric acid/glycerol of different ratios were prepared.

(a) The following procedure was used for the preparation of copolymers with weight ratios of 78:11:11, 78:9:13, 78:7:15 and 78:2:20 of acrolein tetramer/citric acid/glycerol. A similar procedure could be used for other ratios.

1.17 g of acrolein tetramer were added to 0.5 g of anhydrous citric acid and 0.5 g glycerol containing 2% by weight of $FeCl_3$ in a reaction vessel equipped with a nitrogen bleed and a drying tube to exclude moisture. 20 cm$^3$ of ethyl acetate were added to form a mixture which, initially, was not homogeneous. The mixture was continuously stirred and heated on a water bath whereupon it became homogeneous after about half an hour and was permitted to reflux. After one hour of refluxing a further 2.38 g of acrolein tetramer were added together with 30 cm$^3$ methylene chloride. The ratio of acrolein tetramer to the other components was thus 78%. After 30 minutes refluxing after the second addition, the solution was film-forming. The solution was then neutralised by adding a few drops of triethylamine. The concentration of the polymer in the solution was 9% w/v. Polymer powder was obtained by precipitation by adding excess hexane.

(b) Copolymers of acrolein tetramer/citric acid/glycerol with ratios of 78:13:9, 78:15:7 and 78:20:2 were prepared by using the following procedure.

1.00 g of acrolein tetramer was added to 0.41 glycerol containing 2% by weight $FeCl_3$ and 0.59 g of anhydrous citric acid in a reaction vessel equipped with a nitrogen bleed and a drying tube to exclude moisture. 50 cm$^3$ ethyl acetate were added to form a mixture which, initially, was not homogeneous. The mixture was continuously stirred and heated on a water bath whereupon it became homogeneous after about 10 minutes and was permitted to reflux. After 25 minutes of refluxing a further 2.55 g of acrolein tetramer were added, along with 25 cm$^3$ methylene chloride and 0.4 cm$^3$ 0.3% ferric chloride solution in methylene chloride. The ratio of acrolein tetramer to the other components was thus 78% of the total content of acrolein tetramer/citric acid/glycerol. After 10 minutes refluxing after the second addition the mixture was film-forming. The solution was then neutralised with triethylamine.

Polymer powder was obtained by precipitation by adding excess hexane. By using the above procedure, copolymers of acrolein tetramer/citric acid/glycerol with a higher content of citric acid than glycerol were prepared, provided that the necessary additional amount of ferric chloride was added in the second stage.

EXAMPLE 5

2.2 g of acrolein tetramer (0.01 mol) and 10.0 cm$^3$ of a 0.1% $FeCl_3$ solution in methyl acetate were mixed in a reaction vessel. The concentration of acrolein tetramer in the solution was 22 wt. %. The mixture was then allowed to react at a temperature of 20° C. and after 65 minutes a turbid solution was formed. After 70 minutes 1.14 cm$^3$ (0.02 mol) of ethanol as added to terminate the polymerisation.

After the addition of the alcohol, the mixture was refluxed for a further 15 minutes to produce a slightly turbid low viscosity solution. The solution, spread on a glass microscope slide, produced a continuous solid dry polymeric film.

Polymer powder was obtained by adding excess alcohol or hexane to the solution.

EXAMPLES 6 TO 8

The materials used in these three Examples were:

(a) a cycloaliphatic epoxy resin (Trade Mark CY179, 3M Company);

(b) epoxy curing agent FC503 (Trade Mark, 3M Company);

(c) the polymer, in solution in methyl acetate, produced according to Example 5.

The three components were admixed, in the proportions by weight given in the Table below, and the methyl acetate was evaporated off in the dark in an oven with forced ventilation. The resulting materials were golden yellow in colour.

TABLE 3

| Example No. | 6 | 7 | 8 |
|---|---|---|---|
| FC503 | 10 | 10 | 10 |
| Microparticulate polymer | 20 | 30 | 40 |
| CY179 | 70 | 60 | 50 |
|  | 100 | 100 | 100 |

The products were coated as thin films on an aluminium sheet and were found to cure rapidly to a tack-free, scratch-resistant film after one passage under a U.V. lamp in a line travelling at 300 feet per minute.

EXAMPLE 9

Diglycidylether of hisphenol known as Epikote (Trade Mark) 828 was used to prepare a crosslinked sol in methylene chloride solution.

5 cm$^3$ of $BF_3$ solution was added to a mixture of 100 cm$^3$ 30% Epikote 828 solution and 750 cm$^3$ of methylene chloride. Polymerisation was effected at room temperature under a nitrogen atmosphere for 3 hours, during which time the solution became more viscous.

The mixture was film-forming after 20 minutes and was neutralised, with triethylamine, after 3 hours of polymerisation.

Various polymers based on Epikote 828 were prepared using the above procedure but altering the polymerisation time from 1 hour to 5 hours. The $BF_3$ solution was prepared by diluting $BF_3$ methanol solution to a 45% solution with methylene chloride. The Epikote 828 solution was prepared in methylene chloride.

At the end of the polymerisation, the polymer concentration was 6.5% w/v. However, it was possible to concentrate the solution by using a rotary evaporator while avoiding heating. It was possible to achieve 16% polymer solution without affecting its stability. Polymer powder was obtained by precipitation by adding excess hexane, slowly with continuous stirring. The polymer powder could he readily dispersed again in methylene chloride.

EXAMPLE 10

Polyethylene glycol 6000 (ex ICI) and trimethylol propane were dried under vacuum for 1 hour at 70° C.

Diphenylmethane-4, 4'-diisocyanate (MDI) was distilled under reduced pressure and used immediately.

Polyethylene glycol 6000 (10 g) was placed in a 250 cm$^3$ glass flask equipped with stirrer, nitrogen bleed, condenser and CaCl$_2$ drying tube to exclude moisture with a mixture of dimethylsulphoxide and methyl ethyl ketone in a weight ratio of 1:1 (50 g) and heated to 70° C. MDI (1.15 g) was then added followed, after 5 minutes, by trimethylol propane (0.27 g). The mixture was next heated at 80°–100° C. for 5 hours by which time no infra-red isocyanate absorption hand at 2275 nm could he detected and polymer solution had formed.

Polymer powder was obtained by slowly adding the polymer solution to an excess of cyclohexane or petrol ether (60/80) followed by filtration and drying in a vacuum oven at room temperature.

The powder so formed would readily redisperse to a stable system in either 1:1 dimethylsulphoxide/methyl isobutyl ketone or into water.

The dispersion in water had the interesting characteristic of being clear at room temperature hut of milky appearance at 100 ° C. The dispersion is useful as a thickener in water as it can provide very viscous dispersions at room temperature which show a remarkable reduction in viscosity at elevated temperature.

EXAMPLE 11

3.89 g of triallyl cyanurate was added to 105 cm$^3$ of methyl methacrylate in a round bottom flask heated in a heating mantle. These were stirred together with 5.00 cm$^3$ ethyl acetate under a nitrogen atmosphere for 20 minutes followed by the addition of 5ml of 7% benzoyl peroxide solution. Refluxing and stirring was continued under a nitrogen atmosphere for 5 hours. After 5 hours polymerisation the mixture was cooled to room temperature. Polymer powder was obtained by precipitation by adding the polymer solution gradually to excess methanol.

I claim:

1. A solution polymerization process for forming a sol of cross-linked particles having an average particle size of no greater than 0.2 microns and a weight average molecular weight of from 5,000–20,000,000, which process comprises:
   i) polymerizing one or more monomers, said monomer or at least one of which monomers is a cross-linking agent present in an amount sufficient such that a sol of cross-linked particles is obtained, in a solvent which (a) has a solubility parameter from 2.5 cal$^{1/2}$ ml$^{-3/2}$ below to 1.0 cal$^{1/2}$ ml$^{-3/2}$ above the solubility parameter of the bulk polymeric material and (b) is of the same or adjacent hydrogen bonding group as the bulk polymeric material;
   ii) monitoring the polymerization until said sol is obtained; and
   iii) terminating the polymerization prior to gelation.

2. A composition of matter comprising a sol of cross-linked polymer of one or more monomers, at least one of said monomers being a cross-linking agent, and a solvent having a solubility parameter of from 2.5 cal$^{1/2}$ ml$^{-3/2}$ below to 1.0 cal$^{1/2}$ ml$^{-3/2}$ above the polymers bulk solubility parameter and is of the same or adjacent hydrogen bonding group as said bulk polymer, prepared by polymerizing said monomer(s) in an amount of said solvent sufficient that no gel is formed upon polymerizing said monomer(s) to the point at which said polymerizing mixture forms a coherent film when spread on a glass slide, wherein said at least one monomer is selected from the group consisting of a C1–8 alkyl methacrylate, a bis-methacrylate ester of polyethylene glycol, a bis-methacrylate ester of ethylene glycol and triallyl cyanurate.

* * * * *